(12) United States Patent
Sibert

(10) Patent No.: US 8,707,878 B2
(45) Date of Patent: *Apr. 29, 2014

(54) SYSTEM AND METHOD FOR CONTROLLING DELIVERY OF MATERIALS INTO SUB-SURFACE

(76) Inventor: James E. Sibert, Dallas, TX (US)

( * ) Notice: Subject to any disclaimer, the term of this patent is extended or adjusted under 35 U.S.C. 154(b) by 278 days.

This patent is subject to a terminal disclaimer.

(21) Appl. No.: 12/959,014

(22) Filed: Dec. 2, 2010

(65) Prior Publication Data

US 2011/0153070 A1  Jun. 23, 2011

Related U.S. Application Data

(63) Continuation-in-part of application No. 12/645,600, filed on Dec. 23, 2009, now Pat. No. 7,845,293.

(51) Int. Cl.

| | | |
|---|---|---|
| A01C 23/00 | (2006.01) | |
| A01C 23/02 | (2006.01) | |
| A01C 23/04 | (2006.01) | |
| A01C 15/10 | (2006.01) | |
| A01C 15/16 | (2006.01) | |

(52) U.S. Cl.
CPC ............ *A01C 23/026* (2013.01); *A01C 23/028* (2013.01); *A01C 23/042* (2013.01); *A01C 15/10* (2013.01); *A01C 15/16* (2013.01); *Y10S 111/901* (2013.01); *Y10S 111/915* (2013.01); *Y10S 111/917* (2013.01); *Y10S 111/922* (2013.01)
USPC ........... 111/118; 111/127; 111/129; 111/901; 111/915; 111/917; 111/922

(58) Field of Classification Search
CPC ...... A01C 23/00; A01C 23/007; A01C 23/02; A01C 23/023; A01C 23/025; A01C 23/026; A01C 23/027; A01C 23/028; A01C 23/04; A01C 23/042; A01C 23/047; A01C 7/004; A01C 7/00; A01C 7/04; A01C 7/008; A01C 7/06; A01C 7/16; A01C 7/08; A01C 7/18; A01C 7/20; A01C 7/206; A01C 14/00; A01C 15/00; A01C 15/003; A01C 15/04; A01C 15/06; A01C 15/08; A01C 15/10; A01C 15/16
USPC ............. 111/89, 118–120, 127–129, 7.1–7.4, 111/901, 902, 915, 917, 922, 925
See application file for complete search history.

(56) References Cited

U.S. PATENT DOCUMENTS

| | | | |
|---|---|---|---|
| 1,925,832 A | * | 9/1933 | Fox .............................. 222/146.5 |
| 2,988,025 A | | 6/1961 | Johnston |

(Continued)

*Primary Examiner* — Christopher J Novosad
(74) *Attorney, Agent, or Firm* — Bell Nunnally & Martin LLP; Craig J. Cox

(57) ABSTRACT

A system includes a first chamber configured to hold a liquid and a second chamber configured to hold the particles. A first pump transfers the particles from the second chamber to a third chamber. A first valve during a first time period regulates the delivery of the liquid into the third chamber through a first opening. A second opening directs jets of liquid from the third chamber during the first time period to form holes in the ground. A second valve is operable during a second time period to regulate the first pump to transfer the particles to the third chamber. The first valve is operable during a third time period to regulate the delivery of the liquid to the third chamber through the first opening causing jets of the particles to be directed through the second opening into the holes.

21 Claims, 4 Drawing Sheets

(56) References Cited

U.S. PATENT DOCUMENTS

| | | |
|---|---|---|
| 3,012,526 A | 12/1961 | Baldwin et al. |
| 3,815,525 A | 6/1974 | Kainson et al. |
| 3,875,876 A | 4/1975 | Pustovoit et al. |
| 4,009,666 A | 3/1977 | Russell et al. |
| 4,481,894 A | 11/1984 | Brenn |
| 4,624,193 A | 11/1986 | Johnston |
| 4,715,535 A * | 12/1987 | Mulder ............................ 239/1 |
| 4,805,088 A | 2/1989 | Cross et al. |
| 4,807,544 A | 2/1989 | Cross et al. |
| 4,872,411 A | 10/1989 | Nagy |
| 4,907,516 A | 3/1990 | Rogers |
| 5,101,745 A | 4/1992 | Podevels et al. |
| 5,207,168 A | 5/1993 | Comer |
| 5,370,069 A | 12/1994 | Monroe |
| 5,487,346 A | 1/1996 | Taylor |
| 5,503,091 A | 4/1996 | Foster et al. |
| 5,605,105 A | 2/1997 | Clark et al. |
| 5,983,559 A | 11/1999 | Manabe |
| 6,634,435 B2 | 10/2003 | Saeger |
| 6,892,657 B2 | 5/2005 | Engelke et al. |
| 7,845,293 B1 * | 12/2010 | Sibert ............................ 111/118 |
| 8,235,674 B1 * | 8/2012 | Bhattacharya et al. ......... 417/46 |
| 2005/0163569 A1 | 7/2005 | Allen |
| 2008/0244969 A1 | 10/2008 | Muthiah et al. |
| 2009/0145025 A1 | 6/2009 | Thrash |

* cited by examiner

SYSTEM AND METHOD FOR CONTROLLING DELIVERY OF MATERIALS INTO SUB-SURFACE

FIELD OF THE INVENTION

The invention generally relates to the field of soil maintenance, and more particularly to a system and method for controlled delivery of materials or particles into sub-surface.

BACKGROUND OF THE INVENTION

Hygroscopic materials have been used in terrains to regulate moisture. In agricultural, turf maintenance and other applications, hygroscopic materials have been introduced to absorb rain and irrigation water. The absorbed water is released by the materials over an extended period of time.

Tilling equipments are generally used to plow soil to deliver the materials sub-surface. However, tilling causes soil erosion, destroys turf, and sub-surface disturbances damage in-ground irrigation. In golf greens and other areas, tilling prevents use of the land for a significant amount of time.

High pressure jets, often utilizing venturi effects, have been used to deliver the materials into the soil. While such high pressure jets allow delivery of the materials into the sub-surface without tilling, existing high pressure jets do not precisely control the amount of materials delivered.

SUMMARY

A system for forming holes in ground and for controlled delivery of particles into the holes includes a first chamber configured to hold a liquid and a second chamber configured to hold the particles. The system includes a first pressure mechanism configured to maintain the liquid in the first chamber at a first pressure level. The system includes a first pump operable to transfer the particles from the second chamber to a third chamber.

In one embodiment, the first valve is operable during a first time period to regulate the delivery of the liquid into the third chamber through a first opening. A second opening is configured to direct jets of liquid from the third chamber during the first time period to form holes in the ground. A second valve is operable during a second time period to regulate the first pump to transfer the particles to the third chamber. The first valve is operable during a third time period to regulate the delivery of the liquid to the third chamber through the first opening, causing jets of the particles to be directed through the second opening into the holes.

In one embodiment, the first pump is a venturi pump configured to transfer the particles from the second chamber to the third chamber. The system includes an air pump configured to deliver the air to the first pump via the second valve. The second valve regulates the air flow from the air pump to the first pump. In response, the venturi pump transfers the particles to the third chamber.

The system further includes a control system configured to receive distance information and in response operable to cause the first valve to regulate the delivery of the liquid into the third chamber. The control system causes the second valve to regulate the delivery of the particles into the third chamber. In one embodiment, the control system includes a programmable logic controller operable responsive to the distance information to generate first and second control signals to control the respective first and second valves. In one embodiment, the first and second valves are solenoid activated valves.

BRIEF DESCRIPTION OF THE DRAWINGS

For a more complete understanding of the features, example embodiments and possible advantages of the present invention, reference is now made to the detailed description of the invention along with the accompanying figures and in which.

DETAILED DESCRIPTION OF THE INVENTION

The embodiments of the invention disclosed herein generally relate to a system and method for controlled delivery of materials (e.g., hygroscopic substances and other particles) into the sub-surface using high pressure jets that cut through soil and carry the materials down to a desired depth. More specifically, the embodiments of the invention relate to a system and method for controlled delivery of substances like Polyacrylamide (P4) and other particles into sub-surface without plowing the soil. The hygroscopic substances hydrate the soil by releasing water over an extended period of time, thus maintaining a desired moisture level in the soil over an extended period of time. The embodiments of the invention may be used, for example, in agricultural lands, lawns and golf courses.

Figure 1:
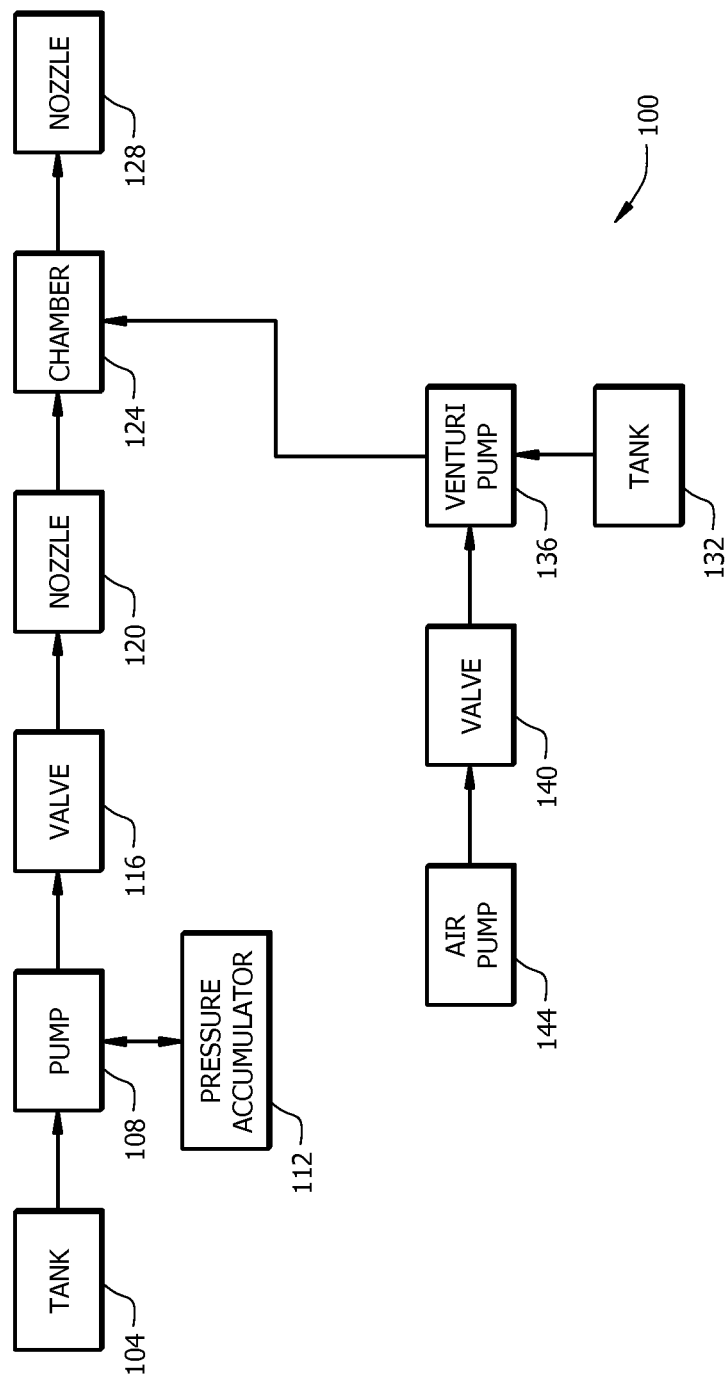
FIG. 1 is a block diagram of a system for forming holes in ground and for directing hygroscopic particles into the holes in accordance with one embodiment.

FIG. 1 is a block diagram of a system 100 for controlled delivery of hygroscopic particles or other particles into sub-surface in accordance with one implementation. The system 100 includes a first supply tank 104 for supplying a liquid such as water. A pump 108 transfers the water from the first supply tank 104 to a first valve 116. In one implementation, a pressure mechanism such as a pressure accumulator 112 in concert with the pump 108 maintains the water at a desired pressure level. In one implementation, the water is maintained at 4000 PSI.

The first valve 116 regulates the delivery of the pressurized water from the pump 108 to one or more openings 120. The openings 120 may be orifices, injection heads, nozzles or other equivalent means. In one implementation, the openings 120 are spaced injection heads. In one embodiment, the nozzles may be a rack of valve nozzle assemblies.

In one implementation, the first valve 116 is a solenoid valve activated by an electrical signal. The electrical signal may be generated by a microprocessor or a programmable logic controller (PLC). It will be apparent that the first valve 116 may be controlled by other known methods. In one implementation, the injection heads 120 direct jets of pressurized water into the ground to form holes.

In another implementation, the first valve 116 transfers the water into the injection heads 120. The injection heads 120 then deliver pressurized water to a chamber 124. The water is subsequently transferred from the chamber 124 to injection heads 128. The injection heads 128 direct jets of pressurized water into the ground to form the holes.

In one implementation, the first valve 116 and the injection head 120 are advantageously used to regulate the thrust of the jets of water into the ground in order to form holes of desired depth. Depending on soil condition, the depth of the holes may be adjusted. If, for example, the soil is of clay-type, the activation period (i.e., ON period) of the first valve 116 may be prolonged to increase the depth of the holes.

The system 100 includes a second supply tank 132 for supplying particles (e.g., hygroscopic particles or other material). In one implementation, the second supply tank 132 may hold Polyaerylamide (P4) or other substances in a particle form or other suitable form. A pump 136 connected to the tank 132 facilitates transfer of the particles from the tank 132 to the chamber 124. Appropriate amounts of water may be added to the particles in the tank 132.

A valve 140 regulates delivery of air from an air pump 144 to the pump 136. The valve 140 may be a solenoid valve controlled by a programmable logic controller or a microprocessor. The valve 140 controls the air flow to the venturi pump 136.

In one implementation, the pump 136 is a venturi punp which blows the particles into a manifold (not shown in FIG. 1) which distributes the particles to the chamber 124. While the system 100 is illustrated having the venturi pump 136, it will be understood that other suitable pumps may be utilized in lieu of the venturi pump 136.

The valve 140 controls the venturi pump by controlling the air flow into the venturi pump 136. By controlling the activation time period of the valve 140 via a programmable logic controller, a microprocessor or other methods, the amount of particles transferred to the chamber 124 can be controlled. The activation time (i.e., ON time) of the valve 140 may be set to deliver a desired amount of the particles into the chamber 124. Depending on the soil condition, the amount of hygroscopic particles delivered to the holes may be controlled.

After the hygroscopic particles are delivered into the chamber 124, the first valve 116 is activated again to force pressurized water from the pump 108 into the chamber 124. Consequently, the hygroscopic particles are forced into the injection heads 128, which direct jets of hygroscopic particles into the holes.

Thus, it will be appreciated that the first valve 116 is activated for a first time period T1 to form the holes in the ground. By adjusting the first time period T1, the depth of the holes can be adjusted. Thereafter, the second valve 140 is activated for a second time period T2 to deliver a desired amount of the hygroscopic particles to the chamber 124. The amount of the hygroscopic particles delivered to the holes can be controlled by adjusting the second time period T2. Finally, the first valve 116 is activated for a third time period T3 to force the hygroscopic particles into the injection heads 128, which direct jets of hygroscopic particles into the holes formed.

It will be appreciated that the system 100 enables a user to form the holes having a desired depth by controlling first valve 116, and further enables the user to deliver a desired amount of the hygroscopic particles into the holes by controlling the second valve 140.

In another embodiment, during activation of the first valve 116 during the first time period T1, the water from the injection heads 120 may be used directly to form the holes, bypassing the chamber 124 and the injection heads 128. However, during the activation of the first valve 116 during the third time period T3, the water from the injection heads 120 will be directed into the chamber 124 to force the hygroscopic particles into the injection heads 128. It will be apparent that such an embodiment will require modifications to the system 100 to enable the water to bypass the chamber 124 during the first time period T1 (i.e., during the holes forming phase) but to enter the chamber 124 during the third time period T3 in order to direct the hygroscopic particles into the holes.

Other variations and modifications will be apparent to those skilled in the art.

Figure 2:
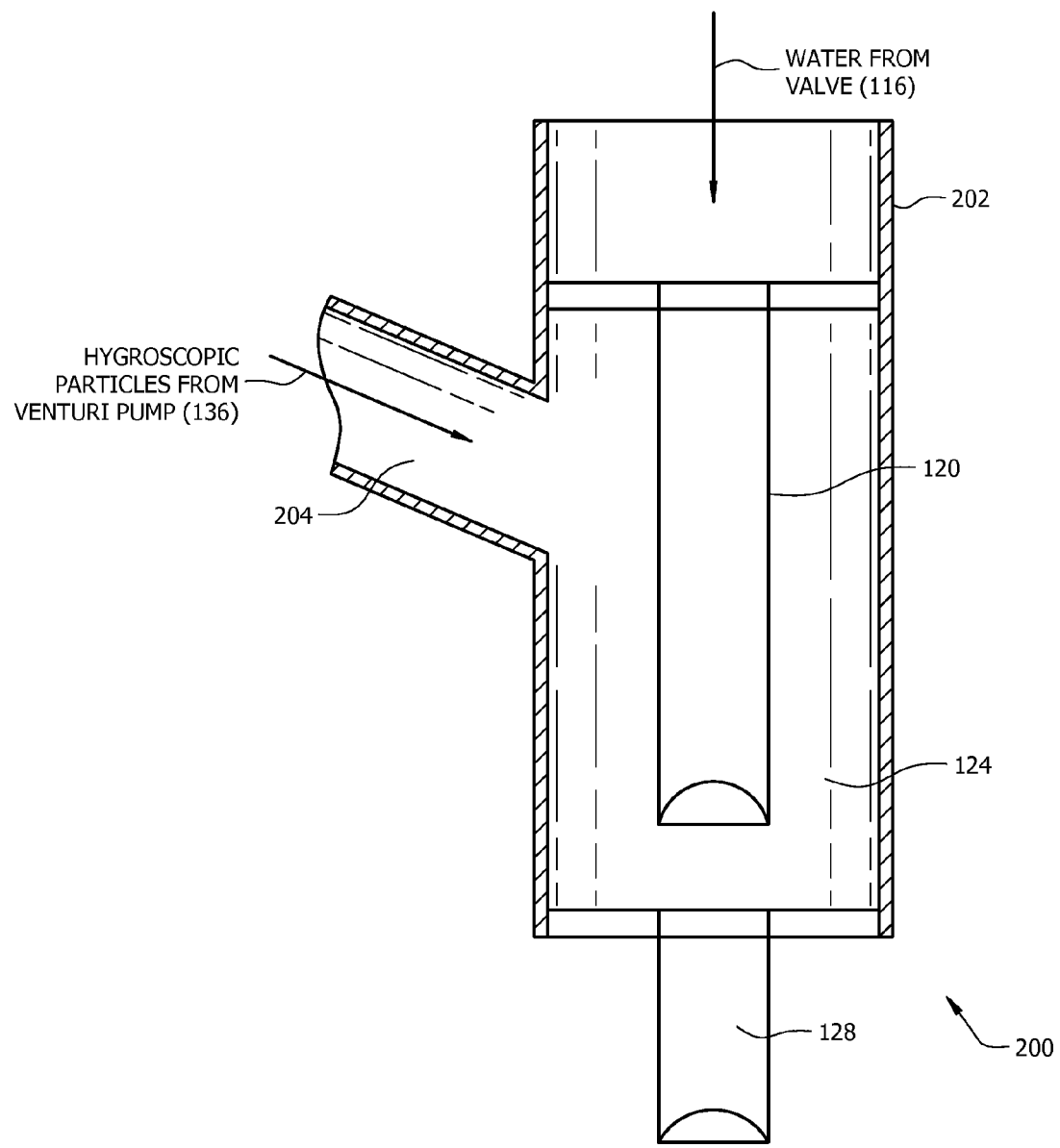
FIG. 2 illustrates an assembly having a chamber.

In one embodiment, the injection heads 120, the chamber 124 and the injection heads 128 may be implemented as an assembly 200 shown in FIG. 2. As shown in FIG. 2, the assembly 200 includes a chamber 124. The injection head 120 is positioned inside the chamber 124 and is configured to direct jets of water into the chamber 124. A tube 202 attached to the assembly 200 supplies pressurized water from the valve 116 to the injection head 120. During the first time period T1, the injection head 120 allows the pressurized water from the valve 116 to enter the chamber 124. The water exits the chamber 124 through the injection head 128 to form holes in the ground. In one embodiment, the system 100 includes a rack of valve nozzle assemblies. Thus, in one embodiment the valves 116 and the nozzles 120 and 128 may be implemented as a rack of valve nozzle assemblies.

During the second time period T2, a tube 204 attached to the chamber 124 delivers the hygroscopic particles into the chamber 124. The hygroscopic particles remain inside the chamber 124 until the third time period T3 during which pressurized water from the injection head 120 forces the hygroscopic particles to exit the chamber 124 through the injection head 128.

Figure 3:
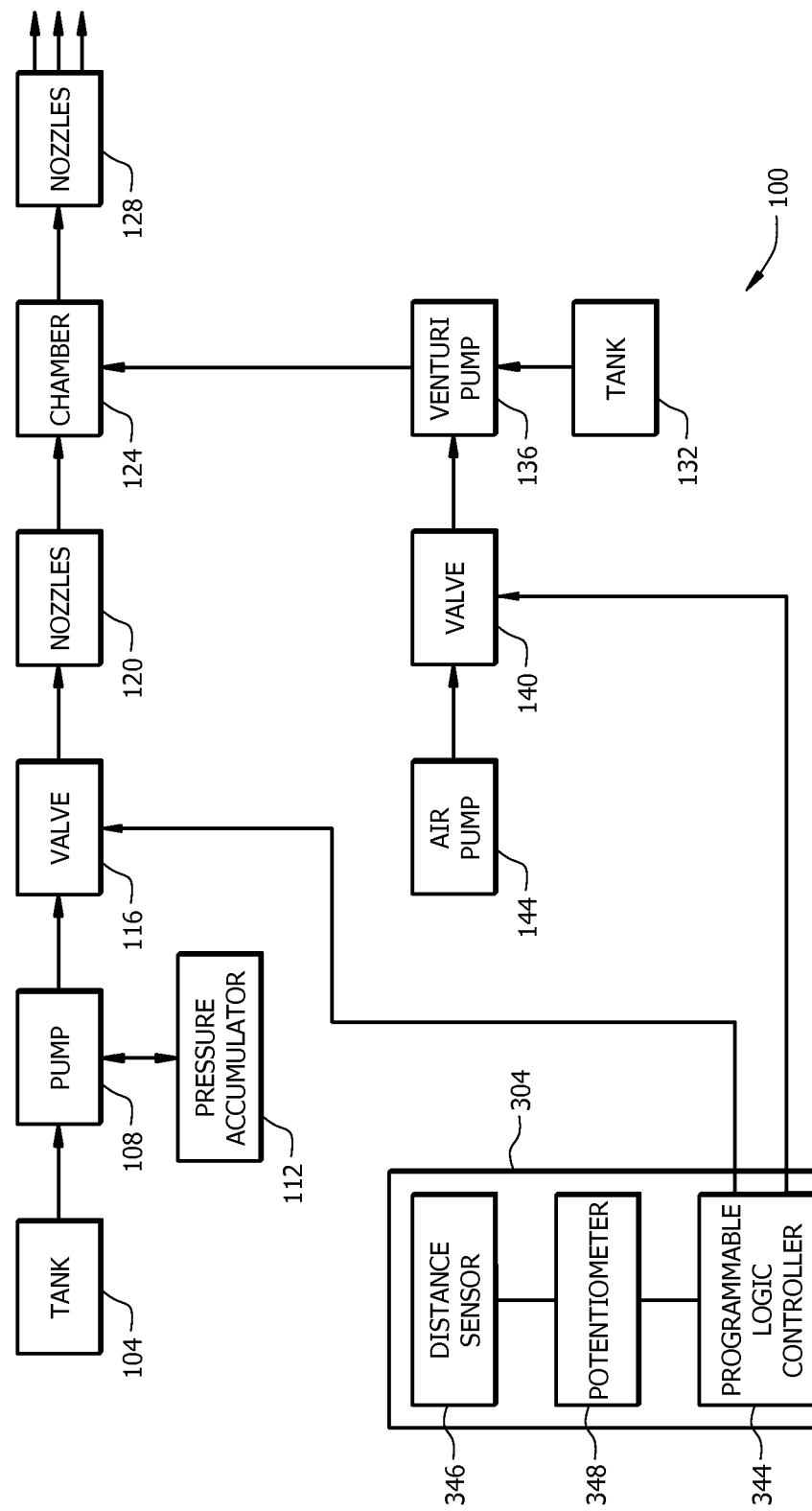
FIG. 3 illustrates an embodiment with a control system.

In one implementation, the first and second valves 116 and 140 are controlled by a control system 304 illustrated in FIG. 3. The control system 304 may be configured to receive distance information from a distance sensor 346 as the system 100 moves along a selected path, and in response generate various control signals for operating the valves and the nozzles. The control system 304 is configured to control the activation time (e.g., T1, T2 and T3) of the first and second valves 116 and 140 based on soil condition.

As discussed before, the activation times of the first and second valves may be prolonged or reduced depending on soil condition (e.g., sandy, clay, rock, etc.). It will be appreciated that the system 100 may include a plurality of injection heads 120 and a plurality of injection heads 128. By incorporating a plurality of injection heads 120 and 128, the hygroscopic particles will be added to the ground at a faster rate.

In one implementation, the control system 304 is configured to also control the injection heads 120 and 128 via the valves 116 and 140. For example, depending on soil condition, the control system 304 may fire only a selected number of injection heads 120 and 128. Thus, if soil condition warrants large amounts of water, all of the injection heads or nozzles may be activated, thereby maximizing the application of hygroscopic particles. On the other hand, sandy soil condition may require less water, which allows the control system to deactivate some injection heads or nozzles, thereby decreasing the amount of hygroscopic particles into the holes. In one embodiment, the control system 304, including the programmable logic controller 344, a potentiometer 348 and the distance sensor 346, may be used to control the spacing of the holes along an X-axis. Also, by firing selected nozzles (e.g., every other nozzle or every third nozzle), spacing of the holes along a Y-axis may be controlled. It will be appreciated that a rack of valve nozzle assembly comprising a plurality of arrayed nozzles will be utilized in the system. Thus, the control system 304 may be used to vary the spacing of the holes along X and Y axes, thereby forming the holes in a desired pattern.

In one embodiment, the control system 304 includes a programmable logic controller 344 which, responsive to distance information, generates first and second control signals to control the respective valves 116 and 140. The system 100 may include a potentiometer 348, which receives the distance information from a distance sensor 346, and in response applies a third signal to the programmable logic controller

344. In response, the programmable logic controller 344 generates the first and second control signals. The first and second control signals cause the jets to discharge from the nozzles (injection heads) at predetermined spaced intervals.

In one implementation, a metering mechanism may be incorporated to the system 100 to precisely meter the amount of hygroscopic particles delivered to the holes. For example, the metering mechanism may precisely control the amount of hygroscopic particles transferred from the second supply tank 132 to the chamber 124. In one implementation, depending on soil conditions, the second control signal adjusts the activation times of the second valve 140 and the metering mechanism to precisely control the amount of hygroscopic particles delivered to the ground.

Figure 4:
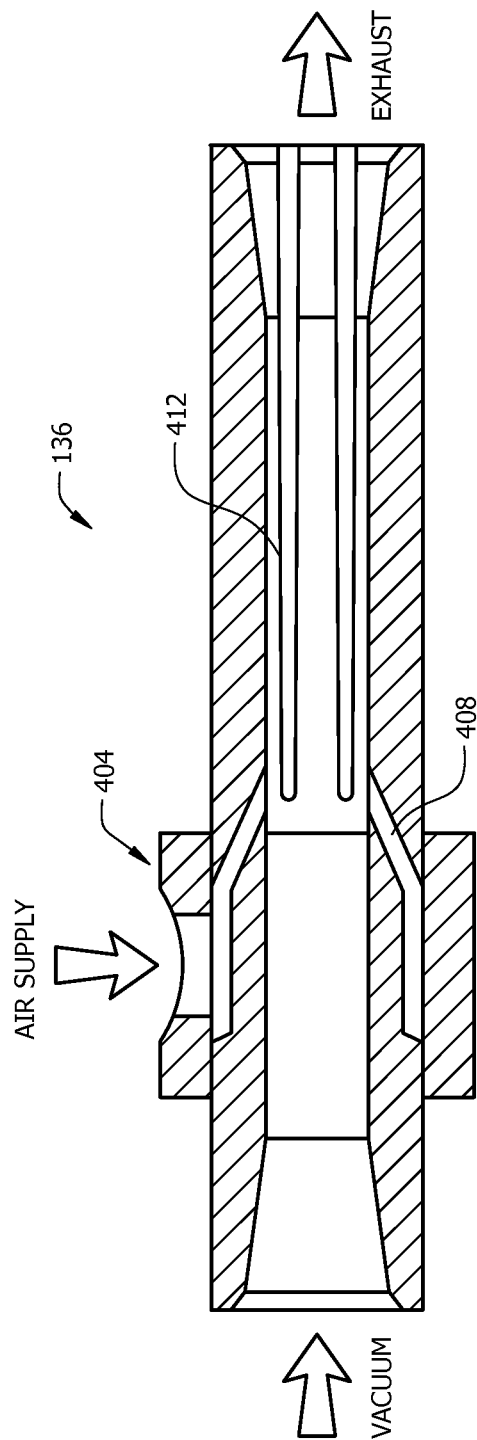
FIG. 4 illustrates a venturi pump in accordance with an embodiment.

As discussed before, in one embodiment, the venturi pump 136 draws particles from the tank 132 and transfers the particles to the chamber 124. The venturi pump 136 may deliver the particles to the tank 132 via a manifold or other known means. FIG. 4 illustrates a venturi pump 136 in accordance with one embodiment. Compressed air is fed into an exterior annular ring 404 that has a number of orifices 408 leading into a tube 412. As the compressed air exits from the orifices 408, its velocity increases. The air forced into the center of the tube 412 rotates with a twisting motion, creating a powerful vacuum capable of drawing materials into and through the tube.

The compressed air is delivered to the venturi pump 136 from the air pump 144 via the valve 140. The valve 140 regulates the amount of air delivered to the venturi pump 136. In one implementation, the activation time (i.e., ON time) of the valve 140 is controlled to regulate the air delivered to the venturi pump 136.

As discussed, the hygroscopic particles release water to the soil over an extended period of time. The hygroscopic particles also absorb rain water from the soil and retain the water over an extended period of time. During dry conditions, the hygroscopic particles release the water back into the soil, thus maintaining moisture level in the soil.

Thus, it will be appreciated that the first valve 116 is activated during the first time period T1 to drill holes in the ground. The second valve 140 is next activated during the second time period T2 to load the hygroscopic particles into the chamber 124. Next, the first valve 116 is activated again during the third time period T3 to force the hygroscopic particles into the holes. The foregoing cycle is repeated as the system 100 moves along a path. Also, it will be appreciated that the system 100 will preferably have a plurality of first injection heads 120 and a plurality of second injection heads 128.

By varying the frequency of activation of the first valve 116, the number of holes may be varied. Thus, for example, the first valve 116 may be activated at a predetermined frequency to form holes that are, for example, three inches apart. Also, by varying the activation period of the first valve 116, the depth of the holes can be varied. Thus, depending on the soil condition, the activation time of the first valve 116 may be adjusted to vary the depth. By varying the activation period of the second valve 140, the amount of hygroscopic particles dispensed is varied.

In one implementation, the system 100 may be embodied in a self propelled machine. The system 100 may also be embodied in a push-type or a pull-type machine. The system 100 may be installed in a machine which allows the operator to walk along the machine to control its operation. Alternatively, the machine may be configured to allow the operator to ride the machine and control its movements.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an," and "the" include plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in the following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A system for forming holes in ground and for controlled delivery of particles into the holes, comprising:
a first chamber configured to hold a liquid;
a second chamber configured to hold the particles;
a first pressure mechanism operable to maintain the liquid in the first chamber at a first pressure level;
a first pump operable to transfer the particles from the second chamber to a third chamber;
a first valve activated during a first time period to regulate the delivery of the liquid into the third chamber through a first opening;
a second opening configured to direct jets of liquid from the third chamber during the first time period to form holes in the ground;
a second valve activated during a second time period to regulate the first pump to transfer the particles to the third chamber wherein the first valve is closed during the second time period preventing the liquid from entering the third chamber while the particles are transferred to the third chamber; and
the first valve activated during a third time period to regulate the delivery of the liquid to the third chamber through the first opening causing jets of the particles to be directed through the second opening into the holes.

2. The system of claim 1, wherein the first pump is a venturi pump configured to transfer the particles from the second chamber to the third chamber.

3. The system of claim 2, further comprising an air pump configured to deliver air to the first pump via the second valve.

4. The system of claim 3, wherein the second valve regulates the air flow from the air pump to the first pump.

5. The system of claim 4, wherein responsive to the second valve the venturi pump transfers the particles to the third chamber.

6. The system of claim 1, further comprising a control system configured to receive distance information and in response operable to cause the first valve to regulate the delivery of the liquid into the third chamber.

7. The system of claim 1, further comprising a control system configured to receive distance information and in response operable to cause the second valve to regulate the delivery of the particles into the third chamber.

8. The system of claim 1, wherein the first opening is an injection head.

9. The system of claim 1, wherein the second opening is an injection head.

10. The system of claim 1, further comprising a sensor operable to provide distance information to the control system as the system traverses the ground in a path.

11. The system of claim 10, wherein the control system comprises a programmable logic controller operable responsive to the distance information to generate first and second control signals to control the respective first and second valves.

12. The system of claim 1, wherein the first and second valves are solenoid activated valves.

13. The system of claim 1, wherein the first pressure mechanism comprises a pressure accumulator operable to deliver the liquid at the first pressure level into the first valve.

14. The system of claim 1, wherein the control system is operable to regulate the duration of the jets of particles.

15. The system of claim 1, wherein the control system is operable to regulate the duration of the jets of liquid.

16. The system of claim 1, wherein the particles are water retaining particles.

17. The system of claim 1, wherein the injection heads alternatively direct the jets of particles and liquid.

18. The system of claim 1, wherein the particles are hygroscopic particles.

19. A system for forming holes in ground and for controlled delivery of particles into the holes, comprising:
   a first chamber configured to hold a liquid;
   a second chamber configured to hold the particles;
   a first pressure mechanism operable to maintain the liquid in the first chamber at a first pressure level;
   a venturi pump operable to transfer the particles from the second chamber to a third chamber;
   a first valve activated during a first time period to regulate the delivery of the liquid into the third chamber through a first opening;
   a second opening configured to direct jets of liquid from the third chamber during the first time period to form holes in the ground;
   a second valve activated during a second time period to regulate the venturi pump to transfer the particles to the third chamber wherein the first valve is closed during the second time period preventing the liquid from entering the third chamber while the particles are transferred to the third chamber; and
   the first valve activated during a third time period to regulate the delivery of the liquid to the third chamber through the first opening causing jets of the particles to be directed through the second opening into the holes.

20. The system of claim 19, further comprising a control system configured to receive distance information and in response operable to cause the first valve to regulate the delivery of the liquid into the third chamber.

21. The system of claim 19, further comprising a control system configured to receive distance information and in response operable to cause the second valve to regulate the delivery of the particles into the third chamber.

\* \* \* \* \*